United States Patent
Cyr et al.

(10) Patent No.: US 10,023,174 B2
(45) Date of Patent: Jul. 17, 2018

(54) METHODS AND SYSTEMS FOR HYBRID VEHICLE POWER DELIVERY

(71) Applicant: Ford Global Technologies, LLC, Dearborn, MI (US)

(72) Inventors: Steven Michael Cyr, Lake Orion, MI (US); Michael E. Reibling, Sterling Heights, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/261,679

(22) Filed: Sep. 9, 2016

(65) Prior Publication Data
US 2018/0072304 A1    Mar. 15, 2018

(51) Int. Cl.
| | |
|---|---|
| *B60W 20/14* | (2016.01) |
| *B60K 6/44* | (2007.10) |
| *F02D 41/26* | (2006.01) |
| *F02D 41/30* | (2006.01) |
| *F02P 5/04* | (2006.01) |

(52) U.S. Cl.
CPC .............. *B60W 20/14* (2016.01); *B60K 6/44* (2013.01); *F02D 41/26* (2013.01); *F02D 41/3058* (2013.01); *F02D 41/3076* (2013.01); *F02P 5/045* (2013.01); *F02D 2200/503* (2013.01)

(58) Field of Classification Search
CPC ...... B60W 20/14; B60W 10/06; B60W 10/08; F02D 41/26; F02D 41/3058; F02D 41/3076; F02D 2200/503; F02D 15/00; F02D 41/00; B60K 6/44; B60K 6/365; F02P 5/045; F01L 13/0036

USPC .......................................................... 701/22
See application file for complete search history.

(56) References Cited

U.S. PATENT DOCUMENTS

| | | | |
|---|---|---|---|
| 6,443,125 B1* | 9/2002 | Mendler | F02B 41/00 123/316 |
| 7,597,072 B2* | 10/2009 | Stein | F01L 13/0036 123/304 |
| 7,765,806 B2 | 8/2010 | Clark | |
| 8,464,690 B2* | 6/2013 | Yuille | B60W 10/08 123/350 |

(Continued)

FOREIGN PATENT DOCUMENTS

WO    9503482    2/1995

OTHER PUBLICATIONS

He et al., Development of a Hybrid Electric Vehicle With a Hydrogen-Fueled IC Engine, 2006, IEEE, p. 1693-1703.*

(Continued)

*Primary Examiner* — McDieunel Marc
(74) *Attorney, Agent, or Firm* — Julia Voutyras; McCoy Russell LLP

(57) ABSTRACT

Methods and systems are provided for adjusting engine operation of a hybrid vehicle to increase power output and fuel efficiency. In one example, a method may include operating the engine using an Atkinson cycle during a lower than threshold engine torque demand and a lower than threshold battery state of charge, and operating the engine using an Otto cycle during a higher than threshold torque demand. During operation in the Otto cycle, an octane booster is injected to the fuel line to increase the octane level in the fuel, if desired.

20 Claims, 4 Drawing Sheets

(56) References Cited

U.S. PATENT DOCUMENTS

| | | | | |
|---|---|---|---|---|
| 8,544,445 B2* | 10/2013 | Cleeves | ................. | F02D 15/00 |
| | | | | 123/295 |
| 8,578,695 B1* | 11/2013 | Fluhler | ................. | F02D 15/00 |
| | | | | 60/39.01 |
| 8,696,769 B2 | 4/2014 | Ford | | |
| 8,892,330 B2* | 11/2014 | Yuille | ................. | B60W 10/06 |
| | | | | 701/84 |
| 9,267,486 B2* | 2/2016 | Cleeves | ................. | F02D 15/00 |
| 9,308,909 B2* | 4/2016 | Martin | ................. | B60W 10/06 |
| 2007/0204506 A1 | 9/2007 | Brenes | | |
| 2010/0038158 A1* | 2/2010 | Whitney | ............... | B60K 6/365 |
| | | | | 180/65.265 |
| 2010/0288232 A1 | 11/2010 | Bromberg et al. | | |
| 2014/0109870 A1* | 4/2014 | Glugla | ............... | F02B 29/0406 |
| | | | | 123/406.11 |

OTHER PUBLICATIONS

He et al., Design of an innovative 2-by-2 hybrid electric vehicle, 2005, IEEE, p. 32-36.*

Sun et al., Research on the Performance and Emission of a Port Fuel Injection Hydrogen Internal Combustion Engine , 2011, IEEE, p. 299-302.*

Guo et al., Optimal torque distribution strategy of Hybrid Electric Bus based on instantaneous optimization , 2013, IEEE, p. 226-229.*

Mutaza et al., An Alternate Control Framework Development for Atkinson Cycle Engine using Variable Late Intake Valve, 2017, IEEE, p. 866-871.*

* cited by examiner

METHODS AND SYSTEMS FOR HYBRID VEHICLE POWER DELIVERY

FIELD

The present description relates generally to methods and systems for increasing power output of a hybrid vehicle.

BACKGROUND/SUMMARY

Engines in hybrid vehicles may be operated with an Atkinson cycle which provides a higher fuel economy compared to operation in an Otto cycle. When operating in an Atkinson cycle, the intake valve may be held open for a longer duration compared to the duration of intake valve opening during the Otto cycle. Due to the longer opening of the intake valve, the effective compression ratio in an Atkinson cycle is lower than the corresponding compression ratio achieved for an Otto cycle. For an Atkinson cycle, the effective expansion ratio is higher than the compression ratio, thereby providing higher fuel efficiency. As such, the power delivered by operating the engine with an Atkinson cycle may be lower than the power delivered by operating the engine with an Otto cycle. In addition, a fuel with lower octane content may be used while operating the engine with an Atkinson cycle.

Various approaches have been used to operate vehicle engines with the Atkinson cycle. In one example approach shown by Clark in U.S. Pat. No. 7,765,806, an Atkinson cycle is used in the engine of a hybrid vehicle to improve fuel efficiency. Therein, to increase power output of the Atkinson cycle engine during increased driver demand, a compressor may be used to selectively pressurize intake air and provide the desired power. An electric motor may be utilized to operate the compressor. Further, based on the desired power demand, an electric motor in the hybrid powertrain may be used to drive the vehicle and deliver the desired power for effective vehicle operation.

The inventors herein have recognized potential issues with the above mentioned approach. As one example, by using an electrically powered compressor during higher power demands, energy consumption of the engine may increase which may add to parasitic losses of engine power and/or battery power, thereby reducing engine efficiency. Further, during low state of charge conditions of the battery, the electric motor may not be effectively used for rotating the compressor and/or driving the vehicle. The inventors have also recognized that even with the increasing of the intake air supply, the power output of the engine operating with the Atkinson cycle may not be sufficient to meet the driver demand, thereby affecting vehicle performance and increasing noise vibration harshness (NVH) levels.

In one example, the issues described above may be addressed by a method for a hybrid vehicle including an engine and a motor, comprising: responsive to each of a lower than threshold torque demand, and a lower than threshold state of charge of a system battery, operating the engine using an Atkinson cycle, and responsive to a higher than threshold torque demand, operating the engine using an Otto cycle with an octane booster added to injected fuel. In this way, responsive to an increase in driver demanded torque, by injecting an octane additive to the fuel and by adjusting intake valve timing to operate the engine with an Otto cycle instead of an Atkinson cycle, the desired power may be delivered.

As one example, in a hybrid vehicle, during conditions when power desired for vehicle operation is lower than a threshold, and an electric motor cannot be used to deliver the desired power, such as due a battery state of charge being lower than a threshold, the vehicle engine may be operated with an Atkinson cycle to deliver the desired power. During operation with the Atkinson cycle, the intake valve timing may be suitably adjusted to provide a lower compressor ratio. A lower octane content fuel may be injected during engine operation with the Atkinson cycle. During engine operation with the Atkinson cycle, the battery of the electric motor may be charged. If a higher than threshold power is desired, the intake valve timing may be adjusted to operate the engine with an Otto cycle. While operating with the Otto cycle, the engine may operate with a higher compression ratio to deliver the higher power output. In order to further facilitate engine operation with the Otto cycle, an octane booster (additive) may be injected to the fuel system to increase the octane content in the fuel supplied to the cylinders for combustion. The amount of octane booster injected may be based on the current octane level relative to the desired power level. Also, spark timing may be adjusted to operate the engine with an Otto cycle instead of an Atkinson cycle.

In this way, by opportunistically injecting an octane booster to the fuel system and adjusting intake valve timing, an engine may be operated with an Otto cycle to meet a higher torque demand during hybrid vehicle operation. By operating the engine with an Atkinson cycle during conditions when lower power output is desired, and/or when a battery state of charge is lower, fuel efficiency may be improved, and the battery may be charged. The technical effect of adding an octane booster to the injected fuel during engine operation with an Otto cycle is that the octane content of the fuel may be adjusted while the engine is operated with the Otto cycle, allowing for a higher engine output with improved fuel efficiency. Overall, by opportunistically operating a vehicle engine with an Atkinson cycle and an Otto cycle, fuel efficiency may be improved, and desired power output may be delivered.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
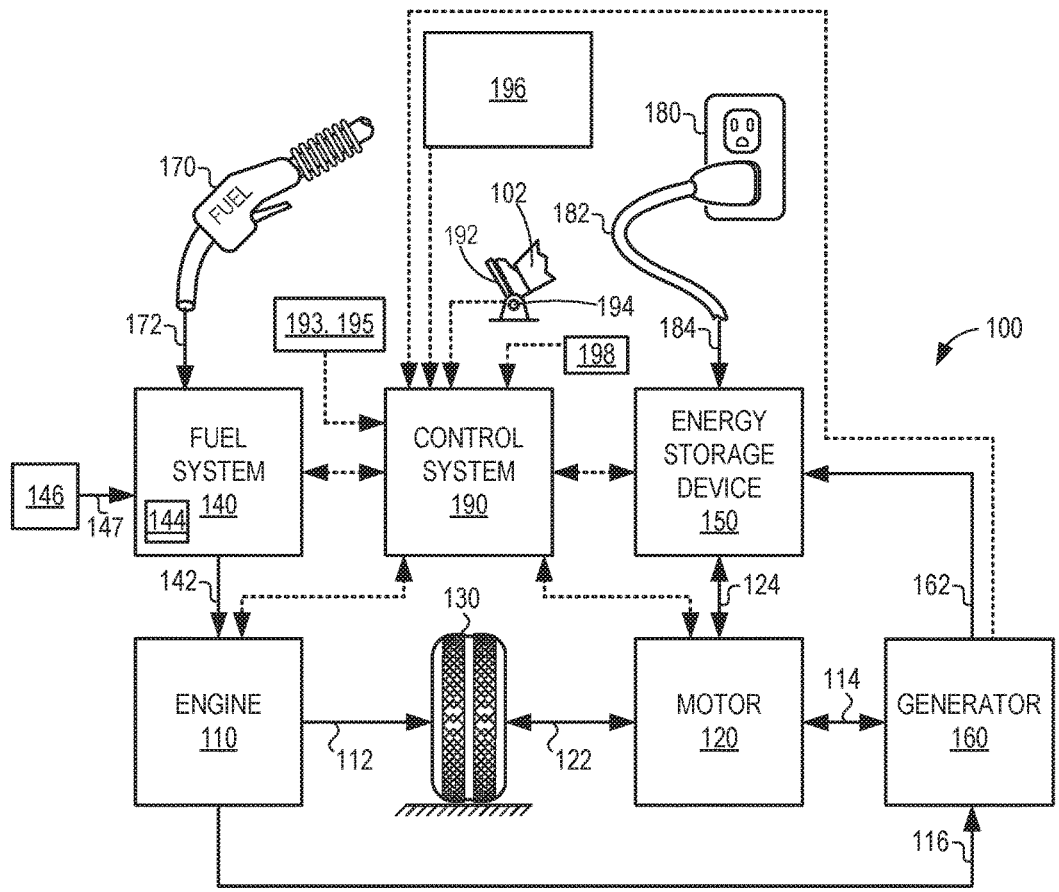
FIG. 1 shows a schematic diagram of an example propulsion system of a hybrid vehicle.
Figure 2:
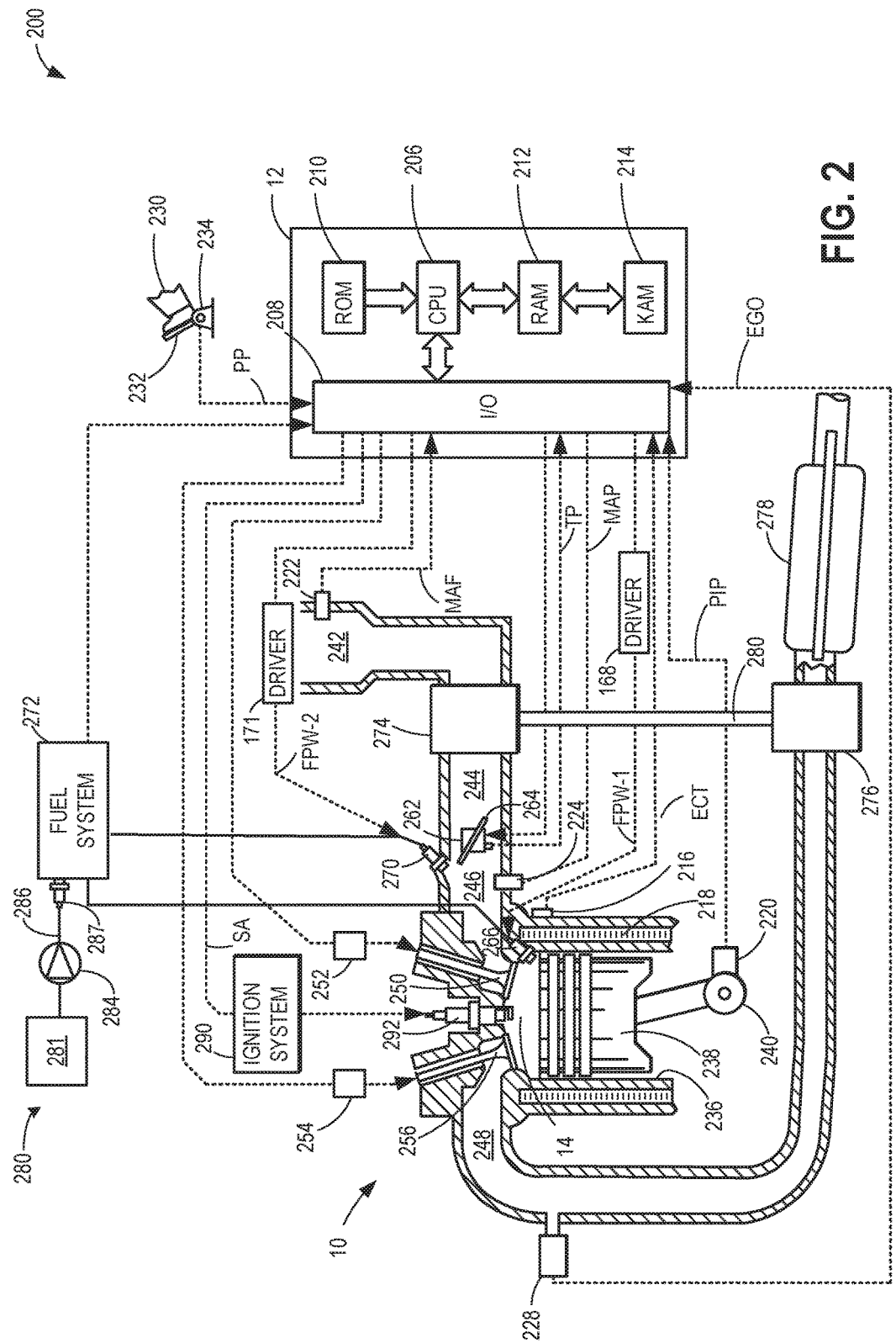
FIG. 2 shows a schematic diagram of an engine system of the hybrid vehicle.

The following description relates to systems and methods for increasing power output of a hybrid vehicle. An example vehicle system with an engine and an electric motor is shown in FIG. 1 and a detailed description of the engine system comprising fuel system and an octane booster system is shown in FIG. 2. An engine controller may be configured to perform a control routine, such as the example routine of FIG. 3 to adjust engine operation to deliver desired torque output while increasing fuel efficiency. An example engine operation to deliver the desired torque output is shown in FIG. 4.

FIG. 1 illustrates an example vehicle propulsion system 100. For example, vehicle system 100 may be a hybrid electric vehicle or a plug-in hybrid electric vehicle. However, it should be understood that, though FIG. 1 shows a hybrid vehicle system, in other examples, vehicle system 100 may not be a hybrid vehicle system and may be propelled solely via engine 110.

Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). While FIG. 1 depicts a HEV, the description is not meant to be limiting and it may be understood that the systems and methods depicted herein may be applied to non-HEVs without departing from the scope of the present disclosure.

In some examples, vehicle propulsion system 100 may utilize a variety of different operational modes depending on operating conditions encountered by the vehicle propulsion system. Some of these modes may enable engine 110 to be maintained in an off state (set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. An octane booster system 146 may be coupled to the fuel system via the octane booster line 147. An evaporative emissions system (herein also referred to as a fuel vapor system) may be coupled to the fuel system 140.

The engine output may be utilized to propel the vehicle as indicated by arrow 112 or to recharge energy storage device 150 via motor 120 or generator 160. During a lower than threshold torque demand when the state of charge of the energy storage device 150 is below a threshold, the engine may be operated using an Atkinson cycle with a lower compression ratio, and during a higher than threshold torque demand, the engine may be operated with a higher compression ratio using the Otto cycle. In one example, an octane booster system 146 may comprise a reservoir for storing the octane booster (fluid), an octane booster line 147, a pump, and an injector to deliver a desired amount of octane booster to the fuel line responsive to a signal from the controller. During engine operation using the Otto cycle, octane content of the fuel injected to the cylinders for combustion may be adjusted by selectively injecting an amount of octane booster to the fuel system, for example responsive to engine knock. Injecting the octane booster may include injecting the octane booster into a fuel line downstream of a fuel reservoir and upstream of a fuel injector. The system may adjust the octane booster injected differently during Otto cycle operation as compared to Atkinson cycle engine, particularly for different battery SOC levels, engine temperature, catalyst temperature, desired engine torque, and other factors. Further details of engine operation using each of the Atkinson cycle, and the Otto cycle is discussed with relation to FIG. 3.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, octane booster system 146, energy storage device 150, generator 160, an onboard global positioning system (GPS) 193, and onboard cameras 195. Further, control system 190 may send control signals to one or more of engine 110, motor 120, fuel system 140, octane booster system 146, energy storage device 150, generator 160, and onboard cameras 195, responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient condition sensor 198 such as for estimating ambient temperature or ambient humidity. The vehicle instrument panel 196 may include indicator light(s) and/or a text-based display in which messages are displayed to an operator. The vehicle instrument panel 196 may also include various input portions for receiving an operator input, such as buttons, dials, touch screens, voice input/recognition, etc. In an alternative embodiment, the vehicle instrument panel 196 may communicate audio messages to the operator without display. These devices may be connected to control system 190.

FIG. 2 depicts an example embodiment 200 of a combustion chamber or cylinder of internal combustion engine 10. Engine 10 may be controlled at least partially by a control system including controller 12 and by input from a vehicle operator 230 via an input device 232. In this example, input device 232 includes an accelerator pedal and a pedal position sensor 234 for generating a proportional pedal position signal PP. Torque demand (driver demand) may be inferred from the accelerator pedal position via input of the pedal position sensor 234. Based on operating conditions, the engine may be operated according to one of an Otto cycle and an Atkinson cycle. Operating with the Otto cycle includes operating the engine with a higher compression ratio while operating with the Atkinson cycle includes operating the engine with a lower compression ratio. For example, responsive to each of a lower than threshold torque demand, and a lower than threshold state of charge of a system battery, the engine may be operated using the Atkinson cycle, and responsive to a higher than threshold torque demand, the engine may be operated using the Otto cycle. The threshold torque demand is based on maximum permissible engine power. During engine operation with the Atkinson cycle, the battery of the electric motor may be charged. Once the battery state of charge increases to above a threshold charge, both the electric motor, and the engine may be operated concurrently to deliver the desired torque demand (for example as determined from a pedal position and vehicle speed look-up table for the current transmission gear ratio).

Cylinder (i.e. combustion chamber) 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. The intake passage 244 may include a throttle 262 having a throttle plate 264. In this particular example, the position of throttle plate 264 may be varied by the controller 12 via a signal provided to an electric motor or actuator included with the throttle 262, a configuration that is commonly referred to as electronic throttle control (ETC). In this manner, the throttle 262 may be operated to vary the intake air provided to the combustion chamber among other engine cylinders. The position of the throttle plate 264 may be provided to the controller 12 by a throttle position signal TP. The air intake passage 242 may include the intake air temperature (IAT) sensor and the barometric pressure (BP) sensor. The IAT sensor estimates intake air temperature to be used in engine operations and provides a signal to the controller 12. Similarly, the BP sensor estimates the ambient pressure for engine operations and provides a signal to the controller 12. The intake passage 242 may further include a mass air flow sensor and a manifold air pressure sensor 222 for providing respective signals MAF and MAP to the controller 12.

An exhaust gas sensor 228 is shown coupled to the exhaust passage 248 upstream of an emission control device 278. The sensor 228 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor. An oxygen sensor may be used to estimate the AFR for both intake and exhaust gas. Based on AFR estimation, engine operating parameters e.g. fueling may be regulated.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder.

Intake valve 250 may be controlled by controller 12 via actuator 252. Similarly, exhaust valve 256 may be controlled by controller 12 via actuator 254. During some conditions, controller 12 may vary the signals provided to actuators 252 and 254 to control the opening and closing of the respective intake and exhaust valves. The position of intake valve 250 and exhaust valve 256 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system. Operating the engine using the Atkinson cycle includes operating the engine with a first compression ratio and a first intake valve timing, and operating the engine using the Otto cycle includes operating the engine with a second compression ratio and a second intake valve timing, the first compression ratio lower than the second compression ratio, the first intake valve timing longer than the second intake valve timing. The longer intake valve timing includes retarding intake valve closing after an intake stroke.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. Operating the engine using the Atkinson cycle further includes operating with a first spark timing, and operating the engine using the Otto cycle further includes operating with a second spark timing, the second spark timing advanced relative to the first spark timing. Alternatively, the second spark timing may be retarded relative to the first spark timing. However, in some embodiments, spark plug 292 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 266 and 270. Fuel injector 266 is shown coupled directly to cylinder 14 for injecting fuel directly therein in proportion to the pulse width of signal FPW-1 received from controller 12 via electronic driver 268. In this manner, fuel injector 266 provides what is known as direct injection of fuel into combustion cylinder 14. While FIG. 1 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from high pressure fuel system 272 including a fuel tank, fuel pumps, a fuel rail, and driver 268. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 270 is shown arranged in intake passage 246, rather than in cylinder 14, in a configuration that provides what is known as port injection of fuel into the intake port upstream of cylinder 14. Fuel injector 270 may inject fuel in proportion to the pulse width of signal FPW-2 received from controller 12 via electronic driver 271. Fuel may be delivered to fuel injector 270 by fuel system 272.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 270 and 266, different effects may be achieved.

Fuel tank in fuel system 272 may hold fuel with different fuel qualities, such as different fuel compositions. These differences may include different alcohol content, different octane, different heat of vaporizations, different fuel blends, and/or combinations thereof etc. In one example, fuels from multiple tanks each containing a fuel of a different octane content may be concurrently supplied to the fuel injectors 270, and 266 for combustion. In another example, the fuel tank 272 may have separate compartments with fuels of different octane contents, and one or more types of fuel may be concurrently injected for combustion.

An octane booster system 280 may be coupled to the fuel system 272 to inject metered amounts of an octane booster to the fuel system during engine operation using an Otto cycle. The octane booster system may comprise an octane booster reservoir 280, one or more octane booster pumps 284, octane booster line 287, and an octane booster injector 287. During lower engine torque demand, the engine may be operated using an Atkinson cycle for increased fuel efficiency (due to lower compression ratio). For engine operation using Atkinson cycle, a lower octane content fuel may be used for combustion. Therefore, during such engine operation, octane booster injection may not be desired. However, during higher engine torque demand, the engine may be operated using an Otto cycle in order to increase engine torque output (due to higher compression ratio). For engine operation using Otto cycle, a higher octane content fuel may be desired. In order to increase the octane content in the combusted fuel, octane booster may be injected to the fuel system. In one example, a metered amount of octane booster may be injected into the fuel line via the octane booster injector 287. In one example, an amount of octane booster injected may be based on an octane content of injected fuel, the amount increased as the octant content of the injected fuel decreases. The amount of octane booster injected may be further based on a difference between an actual torque demand and a threshold torque demand, the amount increased as the difference increases. A detailed description of engine operation using an Atkinson cycle and an Otto cycle is described in FIG. 3. In this way, a single fuel tank may be used for fuel storage, and fuel with different octane contents may be opportunistically injected using the octane additive based on engine operations.

The emission control device 278 is shown arranged along the exhaust passage 248 downstream of the exhaust gas sensor 228. The device 278 may be a three way catalyst (TWC), NOx trap, various other emission control devices, a particulate filter, or combinations thereof.

Controller 12 is shown in FIG. 2 as a microcomputer, including microprocessor unit 206, input/output ports 208, an electronic storage medium for executable programs and calibration values shown as read only memory chip 210 in this particular example, random access memory 212, keep alive memory 214, and a data bus. The controller 12 may receive various signals from sensors coupled to the engine 10, in addition to those signals previously discussed, including measurement of driver torque demand from the pedal position sensor 234, inducted mass air flow (MAF) from mass air flow sensor 222; engine coolant temperature (ECT) from temperature sensor 216 coupled to cooling sleeve 218; a profile ignition pickup signal (PIP) from Hall effect sensor 220 (or other type) coupled to crankshaft 240; throttle position (TP) from a throttle position sensor; and absolute manifold pressure signal (MAP) from sensor 224. Engine speed signal, RPM, may be generated by controller 12 from signal PIP. Manifold pressure signal MAP from a manifold pressure sensor may be used to provide an indication of vacuum, or pressure, in the intake manifold.

The controller 12 receives signals from the various sensors of FIGS. 1 and 2, and employs the various actuators of FIGS. 1 and 2 to adjust engine operation based on the received signals and instructions stored on a memory of the controller 12. In one example, the controller 12 may estimate a torque demand based on input from the pedal position sensor 234, and based on a lower than threshold torque demand, and a lower than threshold battery state of charge (of electric motor in the hybrid vehicle) the controller may send a signal to one or more engine actuators to operate the engine with an Atkinson cycle. As an example, in order to operate the engine with an Atkinson cycle, the controller 12 may send a signal to the actuator 252 coupled to the intake valve to increase the duration of intake valve opening during an intake stroke. If the estimated torque demand is higher than the threshold, the controller may send a signal to one or more engine actuators to operate the engine with an Otto cycle. As an example, in order to operate the engine with an Otto cycle, the controller 12 may send a signal to the actuator 252 coupled to the intake valve to decrease the duration of intake valve opening during an intake stroke. Also, the controller 12 may send a send a pulse-width signal to the octane booster injector 287 to inject a desired amount of octane booster into the fuel line delivering fuel to the cylinders for combustion.

In this way, the systems of FIGS. 1 and 2 provide for a system for a hybrid vehicle comprising: an electric motor with a battery, an engine with a plurality of cylinders, an accelerator pedal with a pedal position sensor, an intake valve, an exhaust valve, and a spark plug coupled to each cylinder, a fueling system comprising a fuel tank, a fuel pump, a fuel line, and a fuel injector, an octane booster addition system comprising an octane booster reservoir, an octane booster pump, an octane booster line and an octane booster injector coupled to the fuel line, and a controller with computer readable instructions stored on non-transitory memory for: inferring a higher than threshold torque demand based on input from a pedal position sensor, and in response to a higher than threshold torque demand, actuating the octane booster injector to inject an amount of octane booster to the fuel line, and operating the engine with a higher compression ratio, a shorter intake valve timing, and a retarded spark timing.

Figure 3:
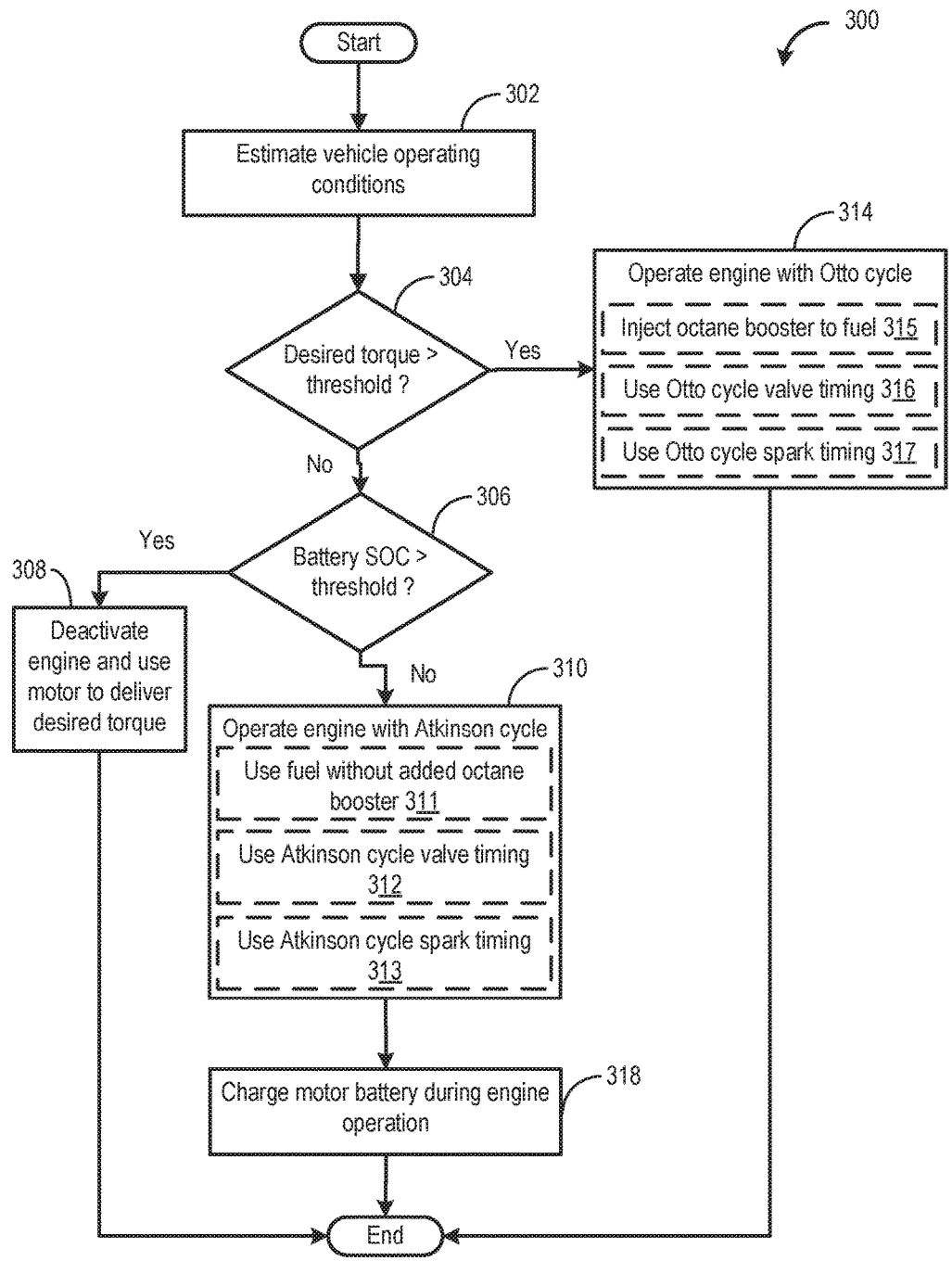
FIG. 3 shows a flow chart illustrating a method that may be implemented for increasing power output and fuel efficiency of a hybrid vehicle.
Figure 4:
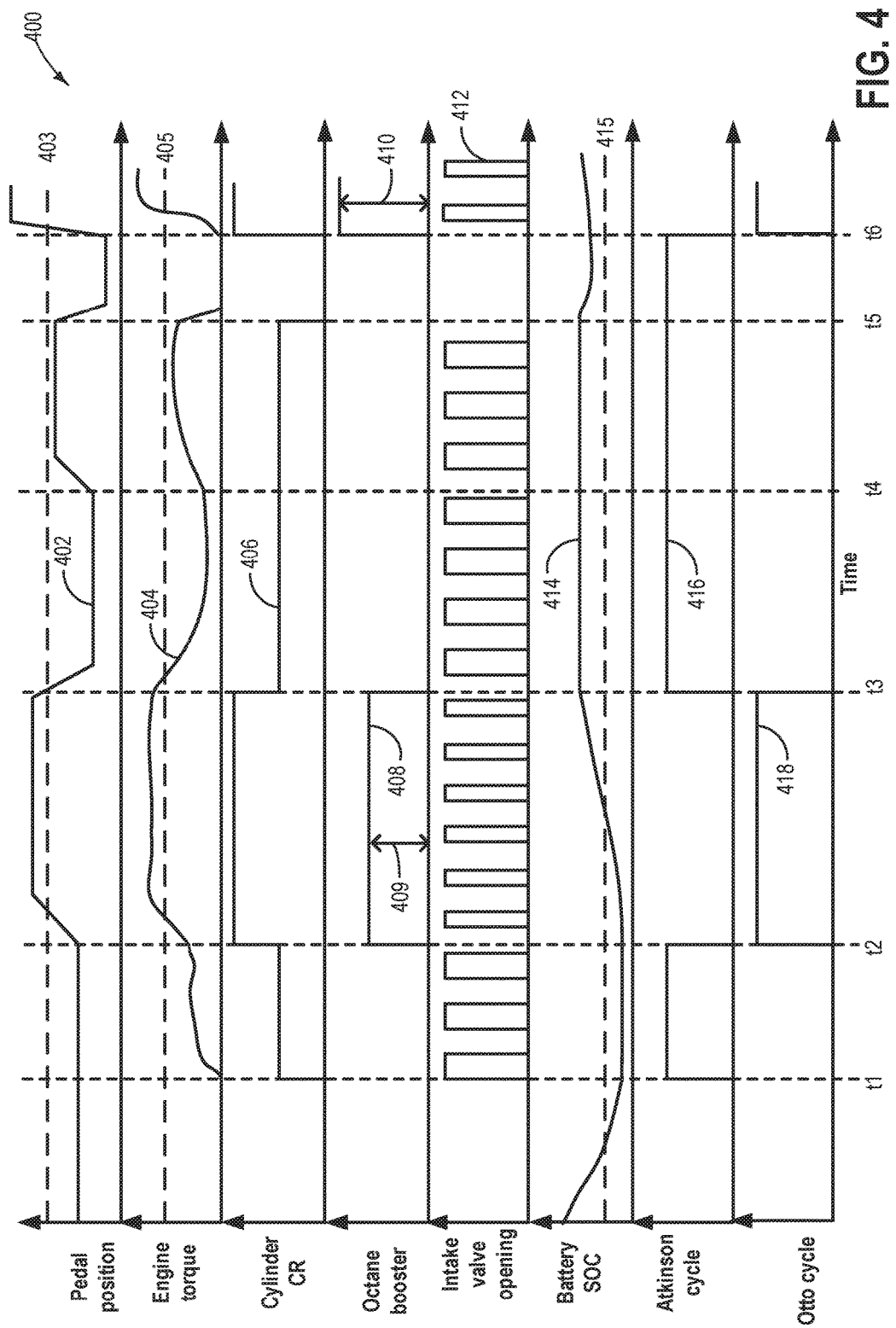
FIG. 4 shows an example operation of the engine of the hybrid vehicle to deliver a desired power output, according to the present disclosure.

FIG. 3 illustrates an example method 300 that may be implemented to adjust engine operation to deliver desired torque output while increasing fuel efficiency. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring current vehicle operating conditions. Conditions assessed may include, for example, a state of charge of a battery coupled to an electric motor, driver torque demand, engine temperature, engine load, engine speed, throttle position, exhaust pressure, exhaust air/fuel ratio, etc. Also, an octane content of the fuel currently available for combustion may be estimated via a fuel sensor. In one example, the fuel sensor may include an alcohol content sensor.

At 304, the routine includes determining if the desired torque (power) demand is higher than a threshold torque. The estimation of torque demand may be based on accelerator pedal position. As the accelerator pedal position increases, the torque demand may correspondingly increase. In one example, the controller may infer the accelerator pedal position based on input from a sensor coupled to the accelerator pedal. The threshold torque demand may be based on a maximum engine power output. As an example, the threshold torque may correspond to 85% of maximum engine power output.

If it is determined that the desired torque demand is lower than the threshold, at 306, the routine includes determining if the battery state of charge (SOC) is greater than a threshold charge. The threshold charge may correspond to a state of charge required for operating the vehicle and supplying the desired torque by operating the electric motor coupled to the battery (that is, by operating the hybrid vehicle in the electric mode). If it is determined that the battery state of charge is sufficient to deliver the desired torque, at 308, the engine may be deactivated and the vehicle may be operated using the electric motor.

However, if it is determined that the battery state of charge is not sufficient to provide the desired torque, at 310, the vehicle engine may be operated using the Atkinson cycle. That is, the vehicle may be transitioned to the engine mode and operated with the Atkinson cycle. In one example, the vehicle may be propelled using motor torque drawn from the electric motor during a lower than threshold torque demand, and responsive to a drop in a system battery state of charge, vehicle operation is transitioned to vehicle propulsion using engine torque with the engine operating with a lower compression ratio. The compression ratio in an Atkinson cycle is lower than the expansion ratio, thereby providing higher fuel efficiency. In one example, during engine operation using the Atkinson cycle, the compression ratio may be 10:1.

Operating the engine using the Atkinson cycle includes, at 311, injecting fuel from the fuel tank, as is, for combustion. As such, the injected fuel may be a lower octane content fuel which is the default fuel available in the fuel tank. In particular, operating the engine with the lower octane content fuel includes not adding an octane booster to the fuel line. Since the addition of an octane additive is not required during engine operation using the Atkinson cycle, operating the engine with the Atkinson cycle may be cost effective. Operating the engine using the Atkinson cycle further includes, at 312, shifting the intake valve timing of the current combustion event to the Atkinson cycle valve timing. The controller may send a signal to the actuator coupled to the intake valve to hold the intake valve open for a longer duration. In one example, during the Atkinson cycle the intake valve may be held open during the intake stroke and also part of the compression stroke. Also, in order to operate the engine using the Atkinson cycle, at 313, the spark timing of the current combustion event may be adjusted to the Atkinson cycle spark timing. In one example, the controller may send a signal to the spark plug to retard the spark timing during such engine operation. In another example, the controller may send a signal to the spark plug to advance the spark timing during engine operation using Atkinson cycle.

At 318, during engine operation with the Atkinson cycle, the battery of the electric motor may be charged. During lower than threshold engine torque demand, once the battery state of charge increases to above a threshold charge, both the electric motor and the engine may be operated (while the engine operating with the Atkinson cycle) concurrently to deliver the desired torque demand.

However, if it is determined (at 304) that the desired torque demand is higher than the threshold, it may be inferred that the vehicle cannot be propelled using motor torque from the electric motor or engine torque from the engine operating with the Atkinson cycle. In one example, the vehicle may be propelled using motor torque from the electric motor during a lower than threshold torque demand, and responsive to an increase in engine torque demand to above the threshold torque demand, vehicle operation is transitioned to vehicle propulsion using engine torque with the engine operating with a higher compression ratio. Therefore, in order to generate the desired torque, at 314, the engine may be operated using an Otto cycle. The compression ratio in an Otto cycle is higher than the expansion ratio, thereby providing higher torque output. In one example, during engine operation using the Otto cycle, the compression ratio may be 12:1. In order to attain the higher torque output by operating the engine using the Otto cycle, a higher octane content fuel may be injected for combustion. Injecting a higher octane content fuel includes, at 315, prior to fuel injection, adding an amount of an octane booster from an octane booster reservoir to a fuel line via an octane booster injector. The amount of octane booster injected may be a based on the octane content of the fuel available in the fuel tank, and the desired torque output. In one example, the current (increased) torque demand may be compared to the threshold torque demand, a difference may be computed between the increased torque demand and the threshold torque demand, and the amount of octane booster injected to the fuel line may be adjusted based on the difference between the increased torque demand and the threshold torque demand. The adjusting may include increasing the amount of octane booster added to the fuel line as the difference increases. The adjustments to the amount of octane booster injected to the fuel line may be further based on an octane level of the fuel, the amount increased as the octane level decreases. The controller may send a signal, such as a pulse-width, to the octane booster injector to inject a desired dosage of the octane booster. The octane booster may increase the octane content in the fuel injected to the cylinders for combustion, and the increased octane content may result in an increased torque output.

Operating the engine using the Otto cycle further includes, at 316, shifting the intake valve timing for the combustion event to the Otto cycle valve timing. The controller may send a signal to the actuator coupled to the intake valve to hold the intake valve open for a shorter duration, such as only during the intake stroke. Operating the engine using the Otto cycle further includes, at 317, adjusting the spark timing for the combustion event to the Otto cycle spark timing. In one example, the controller may send a signal to the spark plug to no longer retard the spark timing during such engine operation. In another example, the spark timing may be retarded during engine operation using Otto cycle.

The routine may then proceed to 318, and during engine operation with the Otto cycle, the battery of the electric motor may be charged. After fulfilling the demand for engine power for vehicle operation, any excess power generated by the engine may be utilized for charging the system battery. In this way, the engine may be opportunistically operated with the Atkinson cycle and the Otto cycle to improve fuel efficiency, and charge the battery of the electric motor.

In this way, a method for a hybrid vehicle comprises: propelling the vehicle using engine torque by injecting a lower octane content fuel into an engine operating with a lower compression ratio, a longer intake valve timing, and a first spark timing, and responsive to an increase in torque demand to above a threshold torque demand, transitioning to propelling the vehicle using engine torque by injecting a higher octane content fuel into the engine operating with a higher compression ratio, a shorter intake valve timing, and a second spark timing advanced relative to the first spark timing. Herein, the lower octane content fuel and the higher octane content fuel are comprised of the same base fuel, the higher octane content fuel generated by adding an octane booster to the base fuel, while the lower octane fuel generated by not adding the octane booster to the base fuel.

FIG. 4 shows an example operating sequence 400 illustrating adjustment of engine operating parameters to deliver desired torque output while increasing fuel efficiency. The horizontal (x-axis) denotes time and the vertical markers t1-t6 identify significant times in the operation of the vehicle.

The first plot, line 402, shows a variation in accelerator pedal position (driver demand) with time. The second plot, line 404, shows a desired torque output of the vehicle engine. The desired torque demand may be estimated based on the pedal position. Dotted line 405 shows a threshold engine torque. When the desired engine torque is below the threshold torque, the engine may be operated using a lower compression ratio via the Atkinson cycle for increased fuel economy, and when the desired engine torque increases to above the threshold torque, the engine may be operated using a higher compression ratio via the Otto cycle to deliver the desired torque. The third plot, line 406, shows a compression ratio of the cylinders during operation of the vehicle engine in the different cycles. The fourth plot, line 408, shows addition of an octane booster to the fuel system. Lines 409, and 410 denote amounts of octane booster added to the fuel between different time intervals. The fifth plot, line 412, shows a pulse-width representing duration of intake valve opening during engine operation. The sixth plot, line 414, shows a state of charge (SOC) of a battery powering an electric motor used for propelling the vehicle. Dotted line 415 shows a threshold battery SOC below which the vehicle may no longer be propelled solely using the electric motor. The seventh plot, line 416, shows engine operation using the Atkinson cycle, and the seventh plot, line 418, shows engine operation using the Otto cycle.

Prior to time t1, the vehicle engine may not be operational, and the vehicle may be propelled using electric motor torque. During this time, as energy from the battery supplying power to the electric motor is used to operate the vehicle, the state of charge (SOC) of the battery may decrease monotonically.

At time t2, the SOC of the battery may decrease to below the threshold SOC, and the electric motor may no longer be used for vehicle propulsion. In response to the decrease in the battery SOC, the vehicle engine maybe started from rest after a period of inactivity. Between time t1, and t2, the pedal position is below the threshold, and the corresponding engine torque demand may be below the threshold level. Therefore, in order to operate the engine in a fuel efficient manner, at t2, the engine is operated using the Atkinson cycle by adjusting the intake valve timing to hold the intake valves open for longer durations (larger pulse width). During operation using the Atkinson cycle, the compression ratio may be lower, resulting in the increased fuel efficiency. During engine operation in the Atkinson cycle, the battery SOC may remain unchanged, as the battery is not used to supply power for vehicle propulsion, and also the battery may not be appreciably charged during engine operation using the Atkinson cycle. Alternatively, the battery may be opportunistically charged during engine operation using Atkinson cycle.

At time t2, the pedal position may increase to above the threshold position and correspondingly the engine torque demand may also increase to above the threshold value. In response to the increase in the desired torque output, the engine may be transitioned to being operated using the Otto cycle. Between time t2, and t3, in order to operate the engine using the Otto cycle, the intake valve timing may be adjusted to hold the intake valves open for shorter durations (smaller pulse width). During operation using the Otto cycle, an octane booster may be injected to the fuel line. The octane booster may increase the octane content in the fuel injected to the cylinders for combustion, and the increased octane content may result in an increased torque output. Injecting the amount of octane booster to the fuel line includes injecting octane booster from the octane booster reservoir to the fuel line via an octane booster line, an octane booster pump, and an octane booster injector. The amount of octane booster injected (as shown by the line 409) is increased as a difference between torque demand and the threshold torque demand increases, the amount further increased as the octane content of the fuel available in the fuel tank decreases. During engine operation in the Otto cycle, the engine power available after providing the desired engine torque may be used to charge battery powering the electric motor, therefore an increase may be observed in the battery SOC.

At time t3, the pedal position may decrease to below the threshold position, and consequently the engine torque demand may also decrease to below the threshold. Due to the lower torque demand, between time t3 and t4, the engine may be operated using the Atkinson cycle for increased fuel efficiency. In order to transition from engine operation using Otto cycle to engine operation using Atkinson cycle, the intake valve timing may be adjusted to increase the duration of intake valve opening. Also, the octane booster injector may be disabled to suspend octane booster injection and delivery of the default lower octane content fuel may be resumed. During engine operation with the Atkinson cycle, the battery SOC may not change appreciably.

At time t4, there is an increase in the pedal position; however the pedal position does not increase to above the threshold position. Correspondingly, the engine torque demand may increase but continue to be below the threshold torque. Between time t4 and t5, the engine may be continued to be operated with the lower compression ratio using the Atkinson cycle.

At time t5, there may be a decrease in pedal position. It may also be inferred that at this time, the battery SOC has increased to above the threshold SOC. Therefore between time t5, and t6, the engine may be switched-off, and the vehicle may be propelled solely by using power from the electric motor.

At time t6, the pedal position may increase to higher than the threshold, and the corresponding torque demand may also increase to above the threshold. In order to deliver the desired power, the engine may be restarted and engine operation may be initiated using an Otto cycle having higher compression ratio. An octane booster may be added to the fuel system to increase the octane content of the fuel injected to the cylinders for combustion. Since the engine torque demand at this time is higher than the engine torque demand between time t2, and t2, the amount of octane booster injected post time t6 (as shown by the line 410) is higher than the amount of octane booster injected between time t2, and t3 (as shown by the line 409). The higher octane content of the fuel may facilitate in attaining the desired power level. The engine may be continued to be operated with the Otto cycle until the desired engine power decreases to below the threshold, and then the engine may be operated with an Atkinson cycle for increased fuel economy. During operation in the Otto cycle, engine torque may be generated to meet the higher than threshold torque demand, and concurrently the system battery may be charged.

In this way, in response to an increase in engine torque demand, an octane additive may be opportunistically injected to the fuel system and one or more engine actuators may be adjusted to transition from engine operation using an Atkinson cycle to an Otto cycle in order to deliver the desired power output.

In this way, for a hybrid vehicle system, by opportunistically switching engine operation between an Atkinson cycle and an Otto cycle based on engine torque demand, and system battery state of charge, vehicle performance and energy efficiency may be optimized. By operating the engine with an Atkinson cycle during conditions when lower power output is desired, and/or when a battery state of charge is lower, fuel efficiency may be improved. Also, during engine operation using the Otto cycle, the system battery may be concurrently charged. The technical effect of adding an octane booster to the fuel during operation in the Otto cycle is that an octane content of the fuel may be suitably adjusted without necessitating the presence of multiple fuels in the engine fuel system, and the desired engine torque may be delivered. By adjusting the intake valve timing, and the spark timing during operation in the Otto cycle, and the Atkinson cycle, overall engine performance may be enhanced.

An example method for a hybrid vehicle including an engine and a motor comprises: responsive to each of a lower than threshold torque demand, and a lower than threshold state of charge of a system battery, operating the engine using an Atkinson cycle, and responsive to a higher than threshold torque demand, operating the engine using an Otto cycle with an octane booster added to injected fuel. In any preceding example, additionally or optionally, operating the engine using the Atkinson cycle includes operating the engine with a first compression ratio and a first intake valve timing, and operating the engine using the Otto cycle includes operating the engine with a second compression ratio and a second intake valve timing, the first compression ratio lower than the second compression ratio, the first intake valve timing longer than the second intake valve timing. In any or all of the preceding examples, additionally or optionally, the longer intake valve timing includes retarding intake valve closing after an intake stroke. In any or all of the preceding examples, additionally or optionally, operating the engine using the Atkinson cycle further includes operating with a first spark timing, and operating the engine using the Otto cycle further includes operating with a second spark timing, the second spark timing advanced relative to the first spark timing. In any or all of the preceding examples, additionally or optionally, injecting the octane booster includes injecting the octane booster into a fuel line downstream of a fuel reservoir and upstream of a fuel injector. In any or all of the preceding examples, additionally or optionally, an amount of octane booster injected is based on an octane content of injected fuel, the amount increased as the octant content of the injected fuel decreases. In any or all of the preceding examples, additionally or optionally, the amount of octane booster injected is further based on a difference between an actual torque demand and the threshold torque demand, the amount increased as the difference increases. In any or all of the preceding examples, additionally or optionally, the threshold torque demand is based on maximum permissible engine power. In any or all of the preceding examples, additionally or optionally, operating the engine using one of the Atkinson cycle and the Otto cycle further includes charging the system battery.

Another example method for a hybrid vehicle comprises propelling the vehicle using engine torque by injecting a lower octane content fuel into an engine operating with a lower compression ratio, a longer intake valve timing, and a first spark timing; and responsive to an increase in torque demand to above a threshold torque demand, transitioning to propelling the vehicle using engine torque by injecting a higher octane content fuel into the engine operating with a higher compression ratio, a shorter intake valve timing, and a second spark timing advanced relative to the first spark timing. Any preceding example further comprising, additionally or optionally, propelling the vehicle using motor torque from an electric motor during a lower than threshold torque demand, and responsive to a drop in a system battery state of charge, transitioning to vehicle propulsion using engine torque with the engine operating with the lower compression ratio. Any or all of the preceding examples further comprises, additionally or optionally, propelling the vehicle using the electric motor during a lower than threshold torque demand, and responsive to an increase in engine torque demand to above the threshold torque demand, transitioning to vehicle propulsion using engine torque with the engine operating with the higher compression ratio. In any or all of the preceding examples, additionally or optionally, injecting a higher octane content fuel includes, prior to injection of a fuel from a fuel tank, adding an amount of an octane booster from an octane booster reservoir to a fuel line coupling the fuel tank to the engine via an octane booster injector, and wherein injecting a lower octane content fuel includes injecting the fuel from the fuel tank without adding the octane booster to the fuel line. In any or all of the preceding examples, additionally or optionally, the increased torque demand is based on pedal position, the torque demand increased as pedal position increases, and wherein the threshold torque demand is based on a maximum engine power output. Any or all of the preceding examples further comprising, additionally or optionally, comparing the increased torque demand to the threshold torque demand, computing a difference between the increased torque demand and the threshold torque demand, and responsive to a higher than threshold torque demand, adjusting the amount of octane booster injected to the fuel line based on the difference between the increased torque demand and the threshold torque demand. In any or all of the preceding examples, additionally or optionally, the adjusting includes increasing the amount of octane booster added to the fuel line as the difference increases, the adjusting is further based on an octane level of the fuel in the fuel tank, the amount of octane booster injected increased as the octane level of the fuel in the fuel tank decreases. In any or all of the preceding examples, additionally or optionally, a longer intake valve timing includes maintaining the intake valve in an open position for a longer duration and a shorter intake valve timing includes maintaining the intake valve in the open position for a shorter duration.

In yet another example, a system for a hybrid vehicle comprises an electric motor with a battery, an engine with a plurality of cylinders, an accelerator pedal with a pedal position sensor, an intake valve, an exhaust valve, and a spark plug coupled to each cylinder, a fueling system comprising a fuel tank, a fuel pump, a fuel line, and a fuel injector, an octane booster addition system comprising an octane booster reservoir, an octane booster pump, an octane booster line and an octane booster injector coupled to the fuel line, and a controller with computer readable instructions stored on non-transitory memory for: inferring a higher than threshold torque demand based on input from a pedal position sensor, and in response to a higher than threshold torque demand, actuating the octane booster injector to inject an amount of octane booster to the fuel line, and operating the engine with a higher compression ratio, a shorter intake valve timing, and a retarded spark timing. In the preceding example, additionally or optionally, the controller includes further instructions for: in response to a lower than threshold torque demand and a lower than threshold battery state of charge, actuating the octane booster injector to suspend octane booster injection, and operating the engine with a higher compression ratio, a shorter intake valve timing, and a retarded spark timing. In any or all of the preceding examples, additionally or optionally, injecting the amount of octane booster to the fuel line includes injecting octane booster from the octane booster reservoir to the fuel line via the octane booster line, the octane booster pump, and the octane booster injector, the amount increased as a difference between torque demand and the threshold torque demand increase, the amount further increased as octane content in fuel decreases. In any or all of the preceding examples, additionally or optionally, operating the operating the engine with the higher compression ratio includes generating engine torque to meet the higher than threshold torque demand, and concurrently charging the battery.

Alternatively, and/or in any of the preceding examples, the system may adjust the octane booster injected differently during Otto cycle operation as compared to Atkinson cycle engine. The octane booster injection may be more aggressive responsive to knock during Otto cycle operation than for Atkinson cycle operation (e.g., a higher increase in injection may be provided responsive to an indication of knock, and/or a longer maintenance of octane booster injection may be provided responsive to the knock), as compared with Atkinson cycle engine operation. The difference in the gain between operating modes may further be adjusted for different battery SOCs, including at higher SOCs providing a greater degree of difference between the modes responsive to knock, at least in one example, thus enabling the Otto cycle operation to be even more aggressive at higher SOCs and/or higher ambient air temperatures.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a hybrid vehicle including an engine and a motor; and
a controller with instructions stored on non-transitory memory thereof for operating the vehicle including:
responsive to each of a lower than threshold torque demand and a lower than threshold state of charge of a system battery, operating the engine at a first compression ratio using an Atkinson cycle; and
responsive to a higher than threshold torque demand, operating the engine at a second compression ratio using an Otto cycle with an octane booster added to injected fuel, wherein the second compression ratio is higher than the first compression ratio.

2. The system of claim 1, wherein the instructions for operating the engine using the Atkinson cycle further include operating the engine with the first compression ratio, a first intake valve timing, and without the octane booster added to the injected fuel, and the instructions for operating the engine using the Otto cycle further include operating the engine with the second compression ratio and a second intake valve timing, the first compression ratio lower than the second compression ratio, the first intake valve timing longer than the second intake valve timing.

3. The system of claim 2, wherein the longer intake valve timing includes retarding intake valve closing after an intake stroke.

4. The system of claim 1, wherein the instructions for operating the engine using the Atkinson cycle further include operating with a first spark timing, and the instructions for operating the engine using the Otto cycle further include operating with a second spark timing, the second spark timing advanced relative to the first spark timing.

5. The system of claim 1, wherein the instructions for injecting the octane booster further include injecting the octane booster into a fuel line downstream of a fuel reservoir and upstream of a fuel injector.

6. The system of claim 1, wherein the instructions further include instructions for injecting an amount of octane booster based on an octane content of injected fuel, the amount increased as the octant content of the injected fuel decreases.

7. The system of claim 6, wherein the amount of octane booster injected is further based on a difference between an actual torque demand and the threshold torque demand, the amount increased as the difference increases.

8. The system of claim 1, wherein the threshold torque demand is based on maximum permissible engine power.

9. The system of claim 1, wherein the instructions for operating the engine using one of the Atkinson cycle and the Otto cycle further include charging the system battery.

10. A system comprising:
a hybrid vehicle comprising an engine and a motor; and
a controller with instructions stored on non-transitory memory thereof for operating the hybrid vehicle comprising:

propelling the hybrid vehicle using engine torque by injecting a lower octane content fuel into the engine operating with a lower compression ratio, a longer intake valve timing, and a first spark timing; and responsive to an increase in torque demand to above a threshold torque demand, transitioning to propelling the vehicle using engine torque by injecting a higher octane content fuel into the engine operating with a higher compression ratio, a shorter intake valve timing, and a second spark timing advanced relative to the first spark timing, wherein injecting the higher octane content fuel includes, prior to injection of a fuel from a fuel tank, adding an amount of an octane booster from an octane booster reservoir to a fuel line coupling the fuel tank to the engine via an octane booster injector.

11. The system of claim 10, wherein the instructions further include instructions for propelling the vehicle using motor torque from an electric motor during a lower than threshold torque demand and, responsive to a drop in a system battery state of charge, transitioning to vehicle propulsion using engine torque with the engine operating with the lower compression ratio.

12. The system of claim 10, wherein the instructions further include instructions for propelling the vehicle using an electric motor during a lower than threshold torque demand and, responsive to an increase in torque demand to above the threshold torque demand, transitioning to vehicle propulsion using engine torque with the engine operating with the higher compression ratio.

13. The system of claim 10, wherein the instructions for injecting the lower octane content fuel further include injecting the fuel from the fuel tank without adding the octane booster to the fuel line.

14. The system of claim 10, wherein the increased torque demand is based on pedal position, the torque demand increased as pedal position increases, and wherein the threshold torque demand is based on a maximum engine power output.

15. The system of claim 10, wherein the instructions further include instructions for comparing the increased torque demand to the threshold torque demand, computing a difference between the increased torque demand and the threshold torque demand, and responsive to a higher than threshold torque demand, adjusting the amount of octane booster injected to the fuel line based on the difference between the increased torque demand and the threshold torque demand.

16. The system of claim 15, wherein the instructions for adjusting the amount of octane booster further include increasing the amount of octane booster added to the fuel line as the difference increases, the adjusting further based on an octane level of the fuel in the fuel tank, the amount of octane booster injected increased as the octane level of the fuel in the fuel tank decreases.

17. The system of claim 10, wherein the longer intake valve timing includes maintaining the intake valve in an open position for a longer duration over an intake stroke and the shorter intake valve timing includes maintaining the intake valve in the open position for a shorter duration over the intake stroke.

18. A system for a hybrid vehicle comprising:
an electric motor driven by a battery;
an engine with a plurality of cylinders;
an accelerator pedal coupled to a pedal position sensor;
an intake valve, an exhaust valve, a fuel injector, and a spark plug coupled to each of the plurality of cylinders;
a fueling system comprising a fuel tank, a fuel pump, and a fuel line, the fuel line delivering a fuel drawn by the fuel pump from the fuel tank to each of the plurality of cylinders via a corresponding fuel injector;
an octane booster addition system comprising an octane booster reservoir, an octane booster pump, an octane booster line, and an octane booster injector, the octane booster injector delivering octane booster drawn by the octane booster pump into the fuel line, upstream of the fuel injector; and
a controller with computer readable instructions stored on non-transitory memory for:
inferring a higher than threshold torque demand based on input from a pedal position sensor; and
in response to the higher than threshold torque demand, actuating the octane booster injector to inject an amount of octane booster to the fuel line, where the amount of octane booster injected is based on an octane content of injected fuel; and
operating the engine with a higher compression ratio, a shorter intake valve timing, and an advanced spark timing.

19. The method of claim 18, wherein the controller includes further instructions for:
in response to each of a lower than threshold torque demand and a lower than threshold battery state of charge,
actuating the octane booster injector to suspend octane booster injection; and
operating the engine with a lower compression ratio, a longer intake valve timing, and a retarded spark timing.

20. The method of claim 18, wherein operating the engine with the higher compression ratio includes generating engine torque to meet the higher than threshold torque demand, and concurrently charging the battery.

* * * * *